United States Patent [19]

Shibutani

[11] Patent Number: 5,065,161
[45] Date of Patent: Nov. 12, 1991

[54] SHIP TRACK INDICATING APPARATUS

[75] Inventor: Shozou Shibutani, Hyogo, Japan

[73] Assignee: Furuno Electric Company Limited, Hyogo, Japan

[21] Appl. No.: 459,837

[22] PCT Filed: May 30, 1989

[86] PCT No.: PCT/JP89/00541

§ 371 Date: Jan. 31, 1990

§ 102(e) Date: Jan. 31, 1990

[87] PCT Pub. No.: WO89/12237

PCT Pub. Date: Dec. 14, 1989

[30] Foreign Application Priority Data

Jun. 1, 1988 [JP] Japan ............................ 63-134968
Jan. 11, 1989 [JP] Japan ............................ 1-4439

[51] Int. Cl.$^5$ .................................................. G01S 7/22
[52] U.S. Cl. .................................. 342/176; 342/41; 342/181; 342/182
[58] Field of Search .............. 342/182, 176, 181, 41; 340/984

[56] References Cited

U.S. PATENT DOCUMENTS 3,978,480  8/1976  Tsuruta et al. .................. 342/90
3,981,008  9/1976  Mann ........................... 342/90 X
4,208,657  6/1980  Bryden et al. .................. 342/182

FOREIGN PATENT DOCUMENTS 59-50376   8/1982   Japan .
57-186112  11/1982  Japan .
57-137809  3/1984   Japan .
0247988   11/1986  Japan ........................... 342/41
0869770   6/1961   United Kingdom .............. 342/181

OTHER PUBLICATIONS

"Digiplot" (brochure) Iotron Corp., Bedford, Mass.

Primary Examiner—Gilberto Barrón, Jr.

[57] ABSTRACT

A ship track indicating apparatus displays the ship track of another ship with a line of narrow width on the screen of the indicator of a radar apparatus so that the ship track of another ship can be easily distinguished. The images of another ship are suppressed from being broadened and noise images are prevented from being accumulated. The apparatus includes a radar apparatus for detecting positions of another ship, a transforming device for transforming radar echoes to fine spots, a ship track memory for storing the fine spots representative of positions of another ship to form a ship track, and an indicator for indicating the contents of the ship track memory on the screen thereof. The apparatus also displays the characters of radar echoes such as the size and the attitude thereof.

2 Claims, 14 Drawing Sheets (A)

FIG. 5

TABLE A

| ECHO NUMBER | Rmin | Rmax |
|---|---|---|
| 1 | 8 | 16 |
| 2 | 20 | 21 |
| ⋮ | ⋮ | ⋮ |
| n | | |
| N(θ-1) | 2 | |
| Pθ | 135°21′20″, 35°10′13″ | |

FIG. 6

TABLE B, C

| ECHO NUMBER | W | Rmin | Rmax | A |
|---|---|---|---|---|
| 1 | 4 | 9<br>8<br>9<br>10 | 12<br>16<br>15<br>12 | 0 |
| 2 | | | | |
| ⋮ | ⋮ | ⋮ | ⋮ | ⋮ |
| n | | | | |
| N(θ-1) | 1 | | | |

FIG. 8(B)

| ④ ECHO NUMBER | Rmin | Rmax |
|---|---|---|
| 1 | 10 | 12 |
|  |  |  |
|  |  |  |

| ECHO NUMBER | Rmis | Rmax | ⑤ |
|---|---|---|---|
| — | 0 | 0 |  |
|  |  |  |  |
|  |  |  |  |

| ⑭ ECHO NUMBER | W | Rmin | Rmax | A |
|---|---|---|---|---|
| 1 | 3 | 9<br>8<br>9 | 12<br>16<br>15 | 1 |
|  |  |  |  |  |

| ECHO NUMBER | W | Rmin | Rmax | A | ⑮ |
|---|---|---|---|---|---|
| — | 0 | 0 | 0 | 0 |  |
|  |  |  |  |  |  |

| ㉔ ECHO NUMBER | W | Rmin | Rmax | A |
|---|---|---|---|---|
| 1 | 4 | 9<br>8<br>9<br>10 | 12<br>16<br>15<br>12 | 0 |

→

| ECHO NUMBER | W | Rmin | Rmax | A | ㉓ |
|---|---|---|---|---|---|
| 1 | 4 | 9<br>(8)<br>9<br>(10) | 12<br>(16)<br>15<br>(12) | 0 | (θc)<br>(θ-2) |

→ ANGULAR DIRECTION

↓

DIRECTION TO THE
RADAR APPARATUS

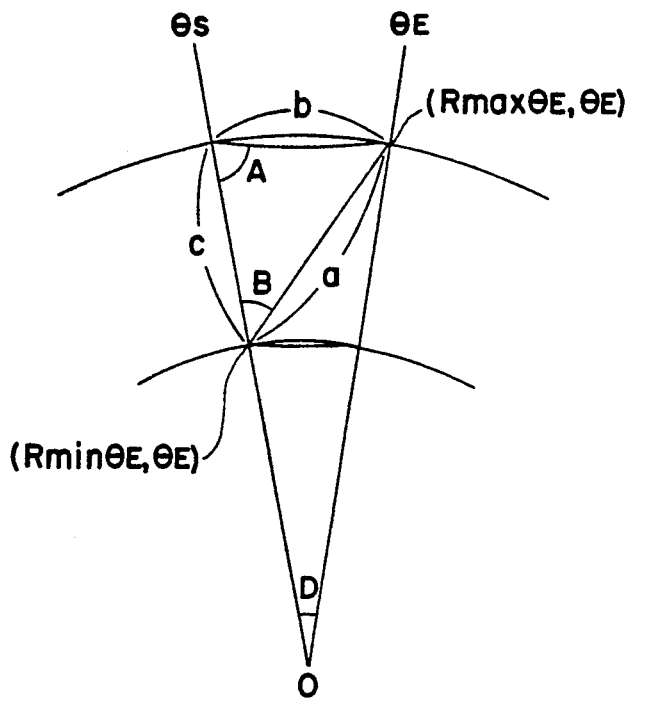
FIG. 11
FIG. 12
| WIDTH (m) | WIDTH DATA | DISPLAY COLOR |
|---|---|---|
| 0 ~ 5 | 0 | BLACK |
| 5 ~ 15 | 1 | BLUE |
| 15 ~ 25 | 2 | LIGTH BLUE |
| 25 ~ 35 | 3 | GREEN |
| 35 ~ 45 | 4 | YELLOW |
| 45 ~ 55 | 5 | DISPLAY COLOR |
| MORE THAN 55 | 6 | RED |
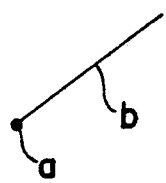
FIG. 13

SHIP TRACK INDICATING APPARATUS

TECHNICAL FIELD OF THE PRESENT INVENTION

The present invention relates to a ship track indicating apparatus for detecting the positions of other ships by means of a radar apparatus and for indicating the tracks of other ships.

TECHNICAL BACKGROUND OF THE PRESENT INVENTION

Up to the present, radar apparatuses have been used for not only locating the present positions of other ships but also observing movements of the other ships by indicating the tracks thereof.

In order to display the track of another ship on the screen of the indicator of a radar apparatus, a prior art method has been used to display on an indicator radar echoes corresponding to tens to a few hundreds of previous radar scans ones over others in a different color from colors for indicating radar echoes obtained with the present or latest radar scan.

FIG. 14 shows an example of an image displayed on the screen of an indicator of a conventional ship track indicating apparatus. As shown in the figure, with conventional ship track indicating apparatii, radar images corresponding to a few tens to a few hundreds of previous radar scans are displayed ones over others so that displayed ship tracks are broadened in width. The width of the ship track becomes wider as the size of a ship becomes larger. This results in a difficulty to distinguish the ship track of each ship from the tracks of the other ships, since the face of the indicator is occupied by many ship tracks. There is another problem that random noises produced with each of a few tens to a few hundreds of radar scans will be accumulated to be displayed on the screen of the indicator, which also makes it difficult to identify the track of another ship.

An object of the present invention is to provide a ship track indicating which is capable of suppressing displayed ship track from being broadened and preventing noise appearances from being accumulated so that each ship track of other ships can be easily identified.

Another object of the present invention is to provide a ship track indicating apparatus which is capable of suppressing ship track images from being widened and easily recognizing from displayed radar echo images characters of radar echoes such as the size of the echoes, the attitude thereof and the like.

DISCLOSURE OF THE INVENTION

A first feature of a ship track indicating apparatus, according to the present invention, comprises a radar apparatus for detecting positions of another ship, radar echo transforming means for identifying a group of radar echoes extending over a predetermined number of radar sweeps in an angular direction and deriving one point or a plurality of points representative of the group of radar echoes, ship track memorizing means for memorizing fine points representative of positions of another ship to form a ship track, and indicating means for displaying the contents of the ship track memorizing means as images on the face thereof.

A second feature of a ship track indicating apparatus, according to the present invention, comprises a radar apparatus for detecting positions of another ship, radar echo group deriving means for deriving a group of radar echoes continuously extending over predetermined widths both in an angular direction and in range from the output signals of the radar apparatus, radar echo transforming means for deriving one point or a plurality of points representative of the derived group of radar echoes, radar echo group's character deriving means for deriving the size and/or altitude of the derived group of radar echoes, ship track memorizing means for memorizing fine spots representative of positions of another ship to form a ship track, echo group's character memorizing means for memorizing the obtained characters of the derived echo group, and indicating means for indicating the contents of the echo group's character memorizing means at positions specified by the contents of the ship track memorizing means.

With regard to the first feature of a ship track indicating apparatus, according to the present invention, the radar apparatus detects the positions of another ship, and the radar echo transforming means identifies a group of radar echoes extending over a predetermined number of radar sweeps in an angular direction and derives one point or a plurality of points representative of the group of radar echoes. The ship track memorizing means memorizes fine points representative of the positions of another ship as a ship track, and indicating means displays the contents of the ship track memorizing means as images on the face thereof. Thus, the ship track of another ship is displayed with a series of points formed with only one point or a plurality of points successively produced, so that the ship track of a ship is displayed with a fine line regardless of the size of the ship. Since, the data stored in the ship track memorizing means are data of fine spots obtained by transforming a group of radar echoes continuously extending a predetermined number of sweeps in an angular direction out of the contents stored in the radar echo memorizing means, random noises which generally do not extend over the predetermined number of sweeps in an angular direction are not handled to transform them to fine spots and therefore are not displayed. Thus, displayed spots due to noises are not accumulated.

FIG. 9 shows an example of the contents stored in the radar echo memorizing means. This example illustrates that echoes continuously extend over seven radar sweeps at its maximum. The radar echo transforming means derives signals produced in the center direction within the azimuth range covering the seven radar sweeps and at a point (cross-hatched portion) closest to the radar antenna.

With regard to the second feature of a ship track indicating apparatus according to the present invention, the radar apparatus detects positions of another ship, and the radar echo group deriving means derives a group of radar echoes continuously extending over predetermined widths both in an angular direction and in range from the output signals of the radar apparatus. The radar echo transforming means derives one point or a plurality of points representative of the derived group of radar echoes, and the radar echo group's character deriving means derives the size and/or attitude of the derived group of radar echoes. The ship track memorizing means memorizes fine spots representative of positions of another ship to form a ship track, and the echo group's character memorizing means memorizes the characters of the derived echo group, and indicating means indicates the contents of the echo group's character memorizing means at positions specified by the contents of the ship track memorizing means.

Accordingly, the ship track of another ship is displayed with a series of points formed with only one point or a plurality of points successively produced and representative of a group of radar echoes, and the characters of the group of echoes are also displayed to recognize the size and/or attitude of the group of radar echoes. This makes it easier to recognize a target of high probability of collision such as a ship, for example, approaching the own ship without changing its attitude and to grasp a sufficient movement capability to avoid a collision from the size of a ship.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5 and 6 are drawings for illustrating data tables formed in the RAM;

FIGS. 8(A) and 8(B) are drawings for showing examples of varying contents in the data tables;

FIG. 11 is a drawing for explaining a method for deriving characters of a group of radar echoes;

FIG. 12 is a drawing for showing the relationship, for example, between display colors and the width of a group of radar echoes;

FIG. 13 shows another display example for illustrating characters of a group of radar echoes;

DETAILED DESCRIPTION OF THE DRAWINGS

Figure 1:
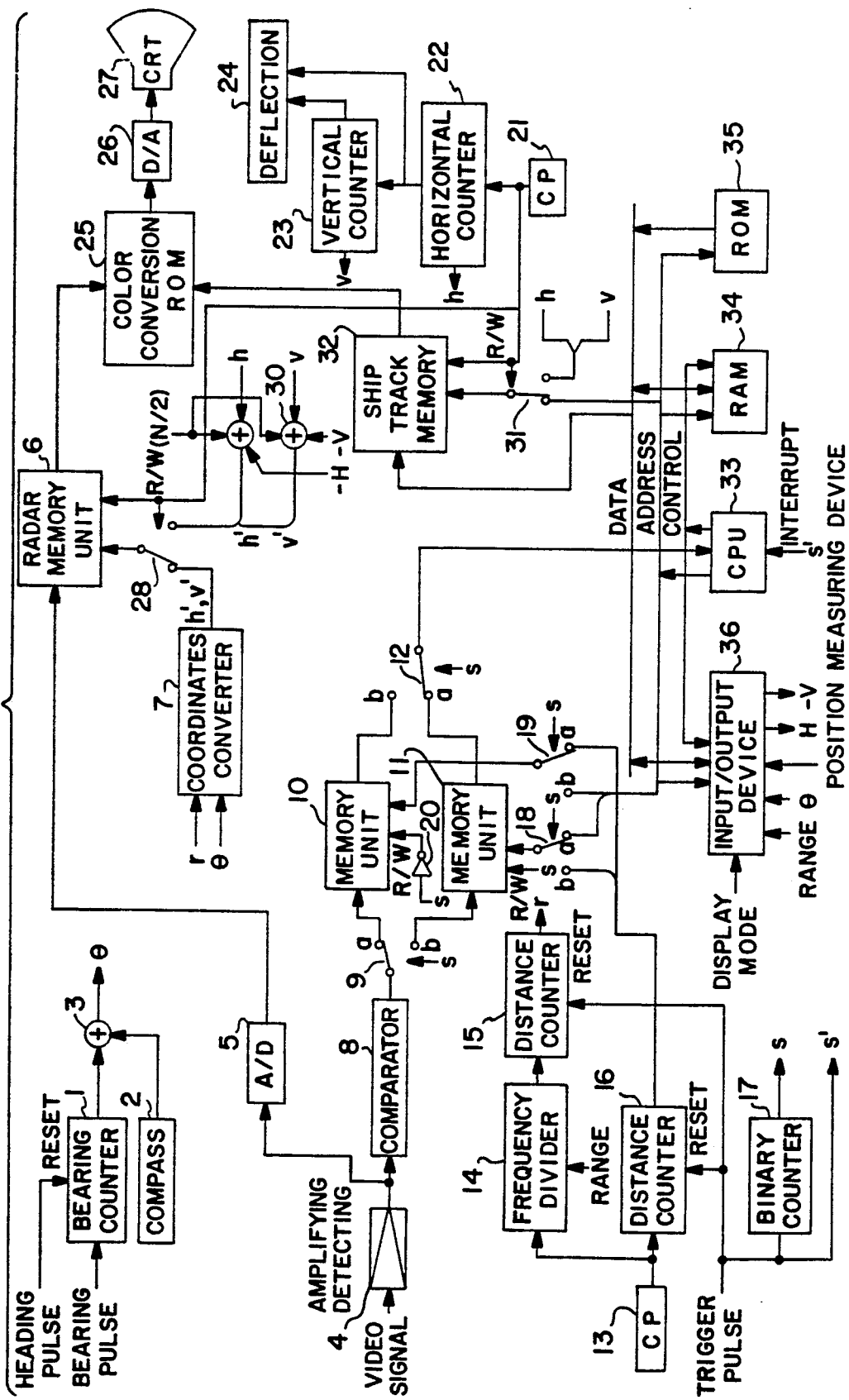
FIG. 1 shows a block diagram of an embodiment of a ship track indicating apparatus according to the present invention.
Figure 2:
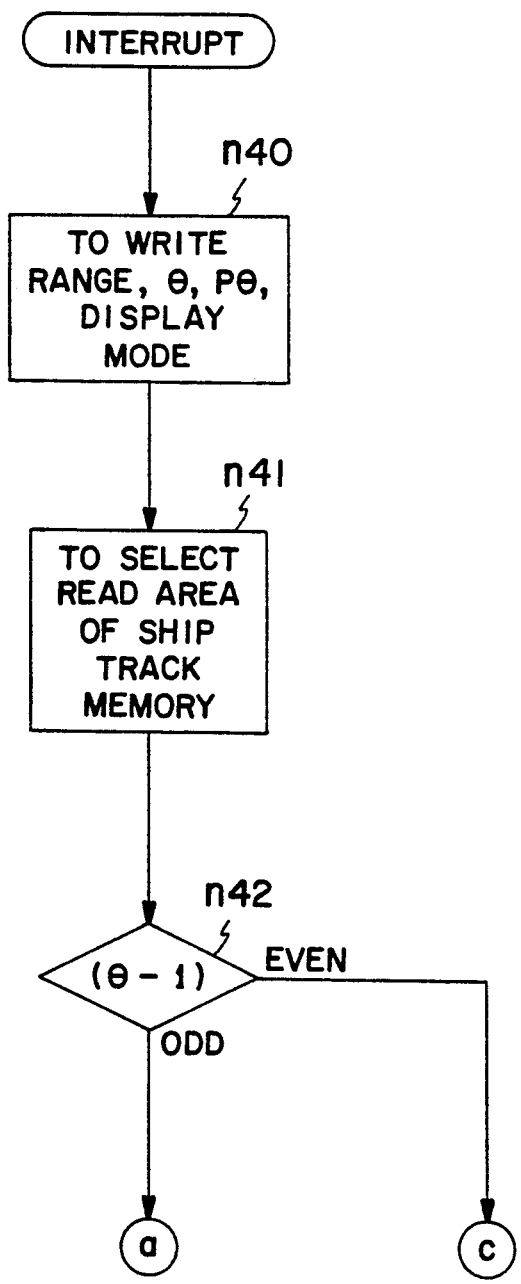
FIGS. 2(A) through 2(E) show flowcharts illustrating the process steps performed by the CPU incorporated in the ship track indicating apparatus.
Figure 2:
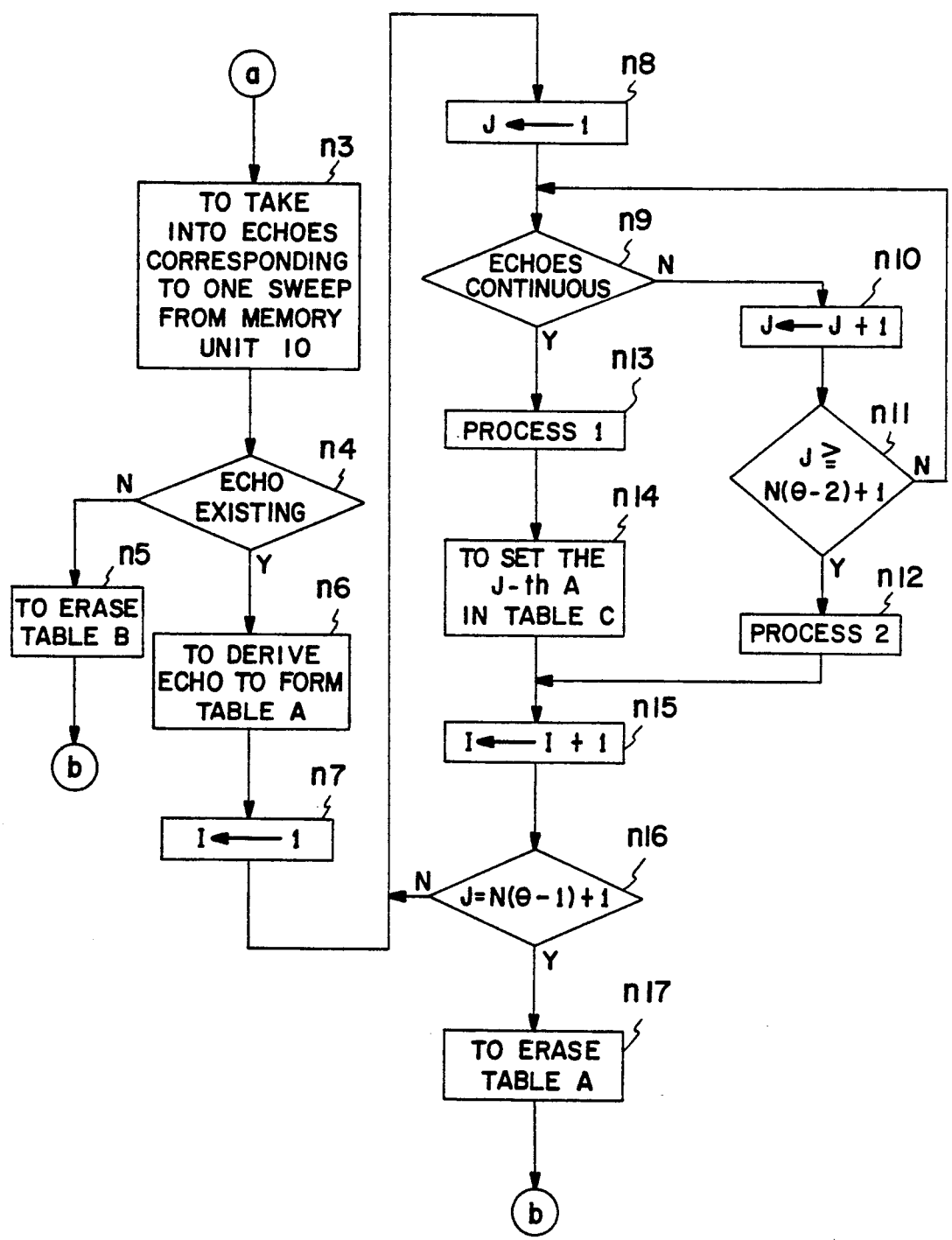
Figure 2:
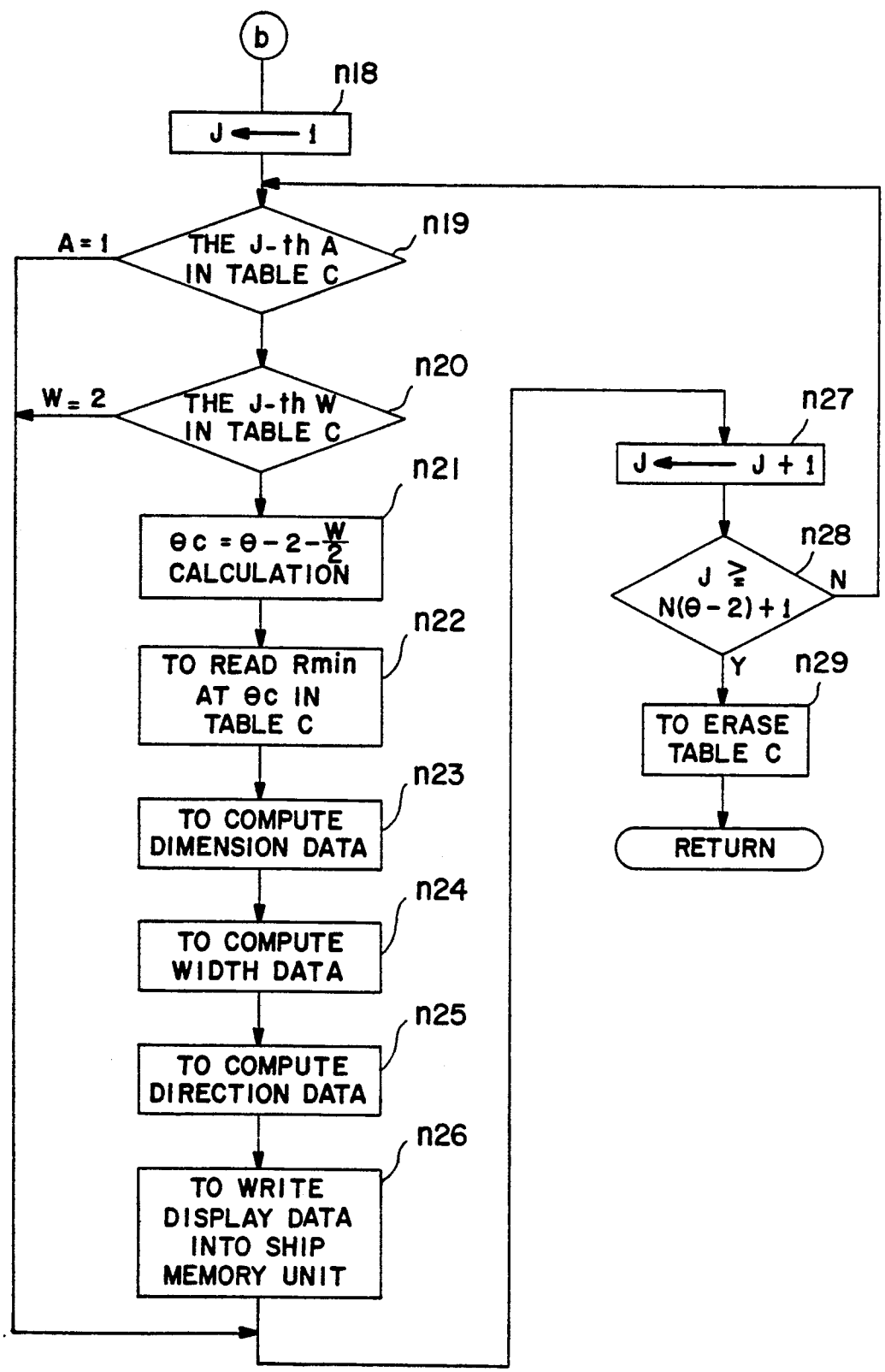
Figure 2:
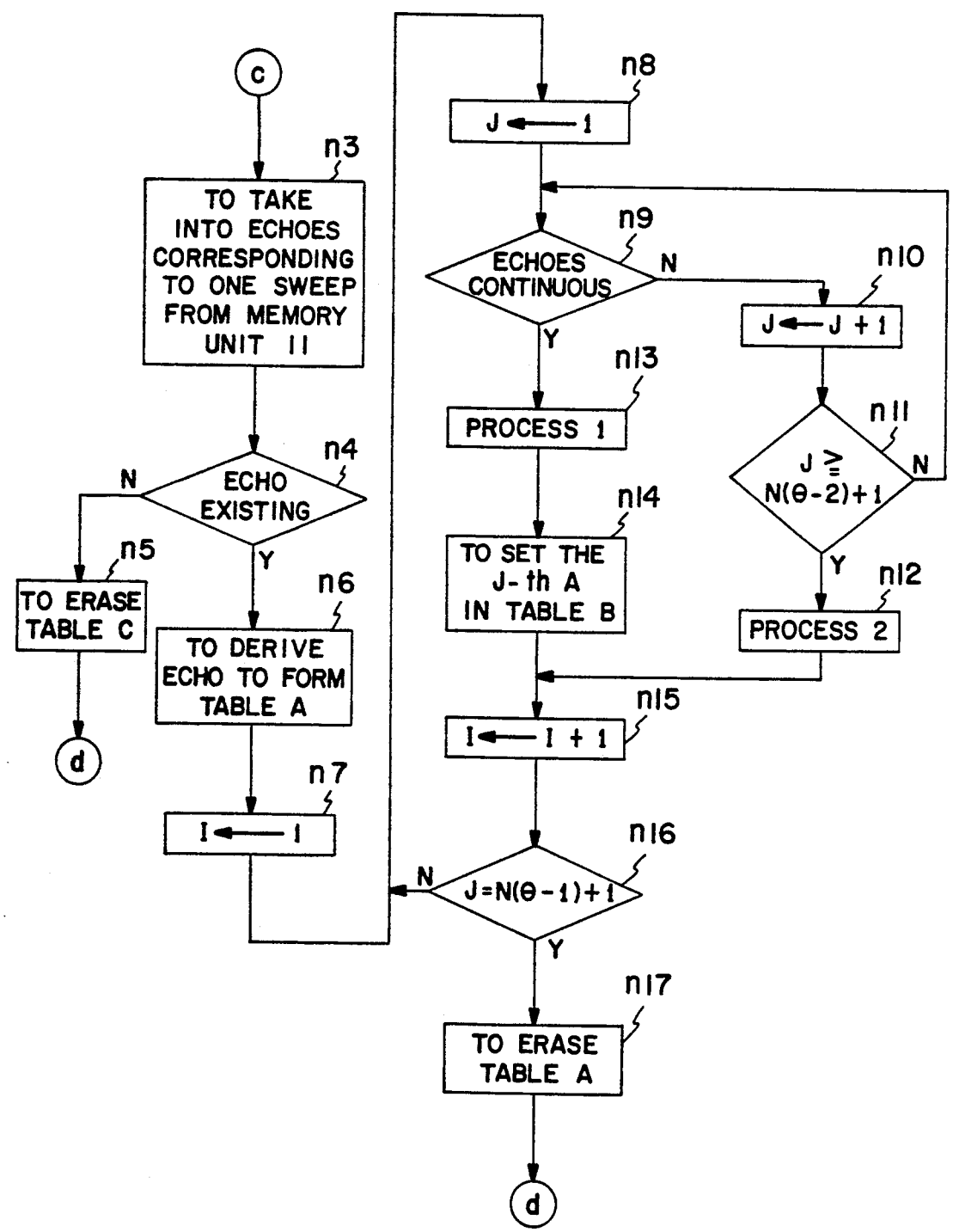
Figure 2:
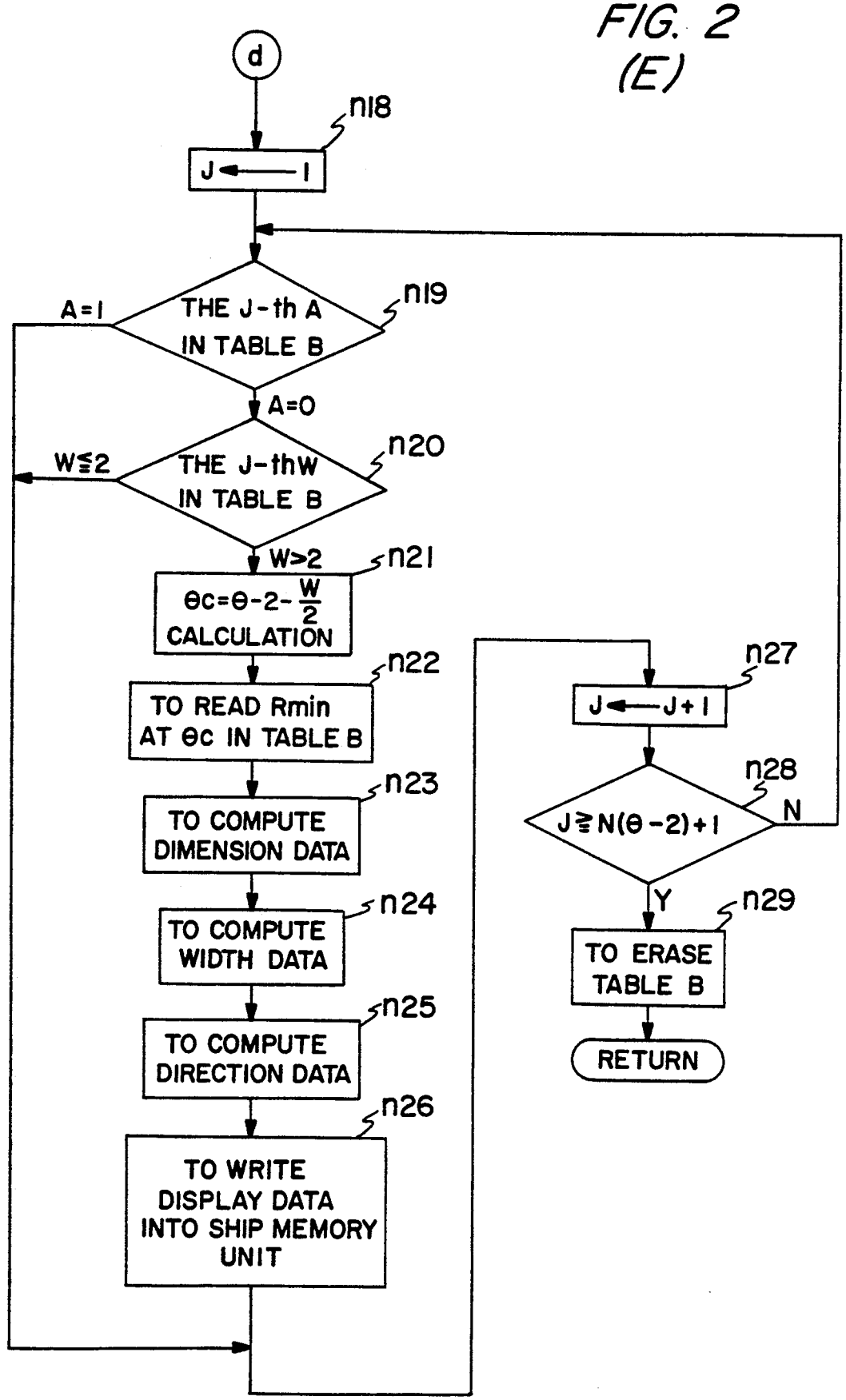

FIG. 1 shows a block diagram of the control unit of an embodiment of a ship track indicating apparatus according to the present invention. Functions and operations performed by respective blocks will be explained below. A bearing counter 1 counts a bearing pulse produced by a radar apparatus (not shown) every one radar sweep or timebase sweep (for example, every one degree) in association with the rotation of an antenna, and is reset by the heading pulse which is produced when the antenna points in the heading direction of the ship, thereby producing counts representative of relative bearings with respect to the heading direction. A compass 2 detects heading bearings of the ship with respect to the north. An adder 3 adds the output values produced both by the bearing counter and the compass to one another to produce an absolute bearing $\theta$ of the antenna. An amplifying and detecting circuit 4 amplifies and detects video signals produced by the radar apparatus. An A/D converter 5 converts video signals into digital codes, thereby producing display data stored in a radar memory unit 6. A clock pulse generator 13 produces reference clock signals in association with the distance a radiated radar search pulse travels. A distance counter 16 counts these clock pulses and is reset by a trigger pulse produced by the radar apparatus. A frequency divider 14 divides in frequency the clock pulses, and a distance counter 15 counts the output signals produced by the frequency divider 14, thereby producing distance data "r" for writing signals into the radar memory unit 6. The frequency divider 14 is also provided with range data representative of a range being searched, and functions to change its frequency division ratio depending on a range datum value set thereinto. A coordinate converter 7 converts the obtained distance data "r" and angle data to corresponding data in Cartesian coordinates reference system, thereby obtaining signals representative of write addresses "h'" and "v'" of the radar memory unit 6 respectively. A switch 28 connects the coordinate converter 7 to the radar memory unit 6 in a write mode operation of the memory unit 6. A clock pulse generator 21 produces timing signals for writing and reading video data corresponding to one picture element of an indicator into and out from the radar memory unit 6 and a ship track memory unit 32. A horizontal counter 22 counts clock pulses produced by the clock pulse generator to produce position data "h" representative of horizontal positions of rasters displayed on a cathode-ray tube 27 and supplies a vertical counter 23 with a pulse signal when the resultant count value reaches a predetermined value. The vertical counter 23 counts pulses produced by the horizontal counter 22 to produce position data "v" representative of vertical positions of the rasters displayed. A deflection circuit 24 drives deflection coils in synchronism with the generations of horizontal synchronization signals produced by the horizontal counter 22 and of vertical synchronization signals produced by the vertical counter 23.

Figure 7:
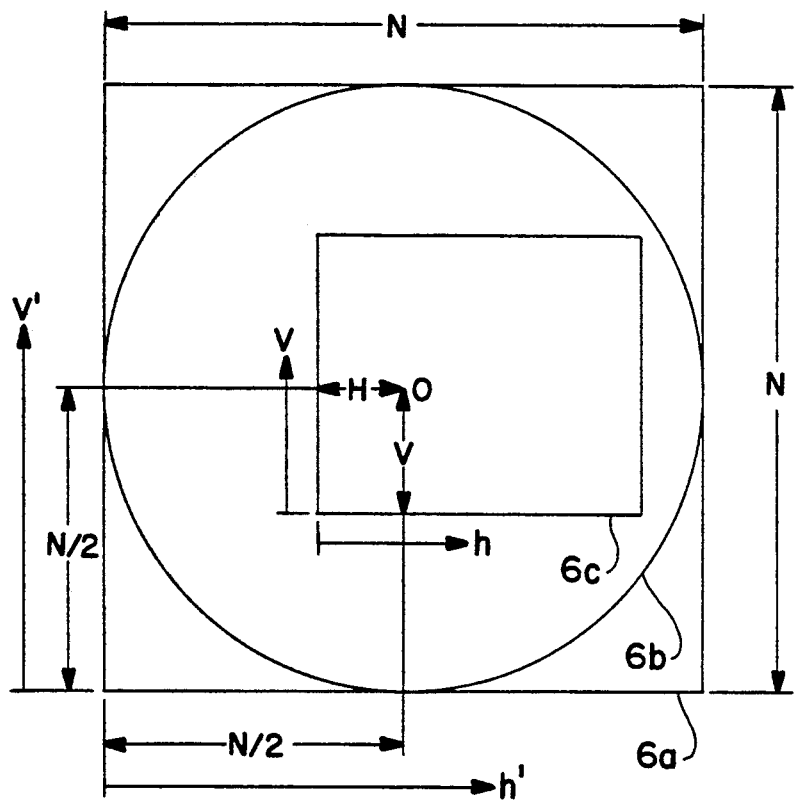
FIG. 7 is a drawing for illustrating the contents stored in the radar memory unit.

The relationship between the contents of the radar memory unit 6 and adresses of the memory elements thereof will now be discussed. FIG. 7 shows an internal memory map of the radar memory unit 6. An area 6a represents the whole memory area in which radar signals are written and stored and comprises $N \times N \times \alpha$ bits. Memory elements of the memory area are identified by the adress signals "h'" and "v'". Here, "$\alpha$" represents bit number of the A/D converter 5, i.e., which produces output signals of $\alpha$ bits. The center of the memory area represents the popsition of the own ship on which the ship track indicating apparatus is installed, and an up direction represents the North. A memory portion represented as "6b" is comprised of memory elements for storing signals which are to be displayed on an indicator. A memory portion represented as "6c" is a memory area corresponding to the whole screen of the cathode-ray tube indicator 27 on which the signals read out from the memory 6c are displayed. The coordinates of a memory element in the memory area 6c are specified by adress signals "h" and "v". Adders 29 and 30 shown in FIG. 1 perform address conversion to obtain address signals for identifying memory elements of the memory area 6c shown in FIG. 7 in reading out and deriving the signals stored therein. The read addresses "h'" and "v'" are obtained with equations h−H+(N/2) and v−V+(N/2) respectively. The values H and V are determined based on longitude and latitude of a reference point in the memory area 6c (left corner), longitudinal and latitude of the own ship's position "O", range and the value of N.

Referring to FIG. 1, the ship track memory unit 32 stores video signals corresponding to the track of the own ship and to the track of other ships. The ship track memory unit 32 corresponds to the ship track memorizing means and the echo group's character memorizing means according to the present invention. The ship memory unit 32 is provided with three arrays of memory elements, with each array having memory elements corresponding to all the picture elements of the screen of the indicator. Thus, a group of three memory elements corresponds to one picture element, with each of the three memory elements belonging to the respective arrays of memory elements. The values stored in the three arrays of memory elements represent the size of a group of echoes, width and direction thereof. In a read out mode of the ship track memory unit 32, a switch 31 is switched to give the other connection to identify a memory element with address signals "h" and "v". In this way, the signals read out both from the radar memory unit 6 and the ship track memory unit 32 are converted to color signals by means of a color conversion ROM 25. A D/A converter 26 generates color video signals depending on the color signals produced by the ROM 25 and applies the resultant signals to the color cathode-ray tube indicator 27.

The video signals produced by the amplifying and detecting circuit 4 are digitized by a comparator 8 into two separate values. Into a memory unit 10 or another memory unit 11, there are written signals obtained during one radar sweep. An inverter 20 converts a signal "s" of one polarity to a signal of the other polarity. The memory unit 10 and the memory unit 11 are alternately driven to write signals thereinto or read signals therefrom. Switches 9 and 12 are alternately driven in response to the signals "s". Further, switches 18 and 19 are also driven in response to the signals "s". The signals "s" are produced by a one-bit binary counter 17 which counts the trigger pulses.

A CPU 33 takes out radar signals from the memory units 10 and 11, temporarily stores the radar signals, distinguishes a group of radar echoes existing over a predetermined number of radar sweeps in an azimuthal direction, processes the distinguished radar echoes so that the radar echoes are displayed as respective small points and obtains characters such as the size, breadth and direction of the group of radar signals. A ROM 35 has been provided with a program written thereinto. A RAM 34 is used as a working area in executing the program. An input and output device 36 inputs into the apparatus signals representative of one of display modes, a range searched and the value of "$\theta$", and also inputs signals representative of the position of the own ship produced by a position measuring apparatus (not shown), and further supplies the adders 29 and 30 with the values "$-H$" and "$-V$" shown in FIG. 7 respectively.

Figure 3:
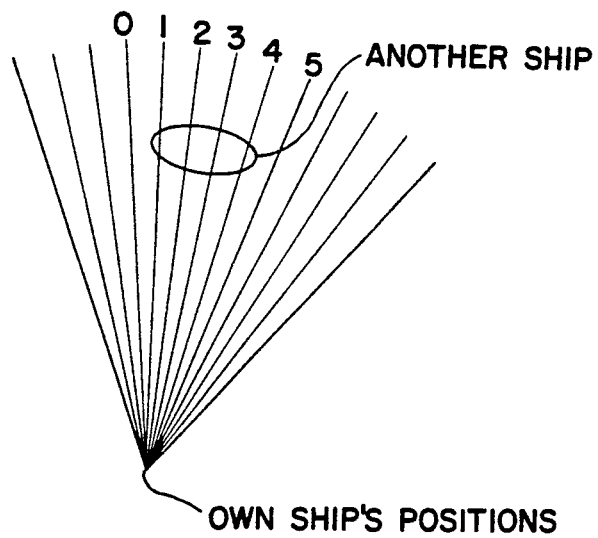
FIGS. 3 and 4 are drawings for explaining an example of radar echoes stored.
Figure 4:
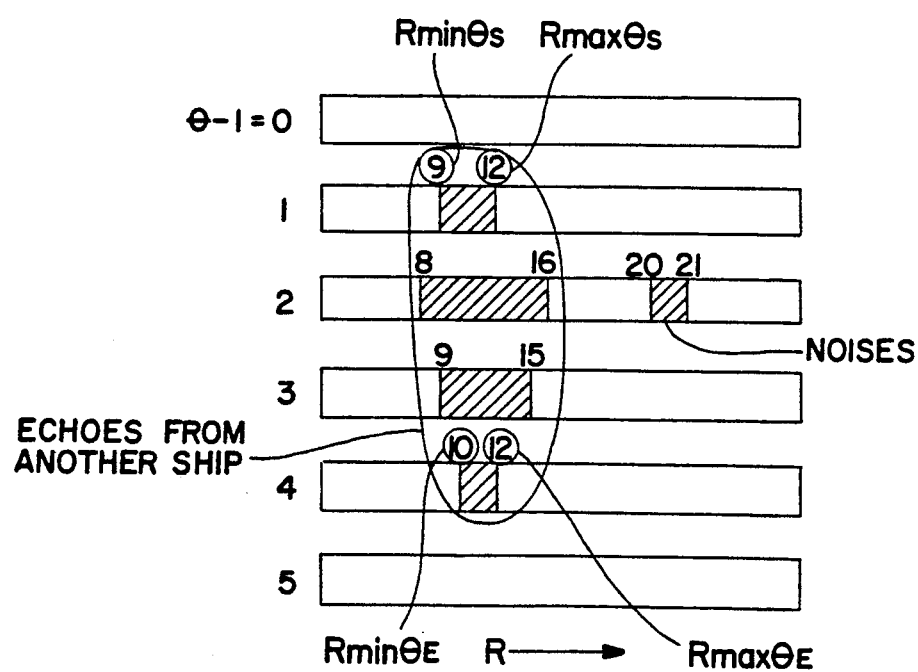

Next, there are shown an example of the data written into and read out from the memory units 10 and 11. FIG. 3 illustrates a relationship between radar sweeps and another ship. FIG. 4 shows signals written into and read out from the memory units 10 and 11, with the signals resulting from the relationship shown in FIG. 3. Referring to FIG. 4, the values of "$\theta-1$" correspond to the numbers given to the radar sweeps shown in FIG. 3. In this example, a group of radar echoes continuously extending over radar sweeps numbered as 1 through 4 are recognized to represent the other ship, and echoes not extending over a predetermined number of radar sweeps in an angular direction are regarded as noises.

Characters of a group of radar echoes such as the size, breadth and direction (attitude) of the group of echoes are obtained as in the following.

As shown in FIG. 4, firstly, a minimum distance value $Rmin\theta$ and a maximum distance value $Rmax\theta$ of each of N echoes produced during the radar sweep are obtained, and echoes extending over a predetermined number of radar sweeps are derived as a group of echoes.

(1) Dimensions $$\left[ \sum_{\theta=\theta_S}^{\theta_E} (Rmax\theta - Rmin\theta + 1) \right].$$

$$\Delta\theta \cdot Rmin\theta_S \cdot \Delta R$$

Here, $\theta_S$: a "$\theta$" direction representing the leading edge of echoes (in FIG. 4, $\theta_S=2$, since it starts with $(\theta-1)=1$)

$\theta_E$: a "$\theta$" direction representing the trailing edge of echoes (in FIG. 4, $\theta_E=5$, since it ends with $(\theta-1)=4$)

Rmin $\theta_S$: Rmin of the $\theta_S$ direction (It is nine in FIG. 4)
Rmin $\theta_E$: Rmin of the $\theta_E$ direction (It is ten in FIG. 4)
Rmax $\theta_S$: Rmax of the $\theta_S$ direction (It is twelve in FIG. 4)
Rmax $\theta_E$: Rmax of the $\theta_E$ direction (It is twelve in FIG. 4)

$\Delta\theta$: Distance between two adjacent dots in an angular direction (in radians)
$\Delta R$: Distance between two adjacent dots in a range direction (in meters)

(2) Width

The points Rmin $\theta_S$ and Rmax $\theta_E$ are illustrated as in FIG. 11. There can be obtained as in the following the distance "a" between these two points represented (Rmin $\theta_S$, $\theta_S$) and (Rmax $\theta_E$, $\theta_E$) respectively in polar coordinates.

$$D = \Delta\theta \cdot (\theta_E - \theta_S) \quad (2)$$

$$A = (\pi - D)/2 \quad (3)$$

$$b = \Delta R \cdot Rmax\, \theta_E \cdot D \quad (4)$$

$$c = \Delta R \cdot (Rmax\, \theta_E - Rmin\, \theta_S) \quad (5)$$

$$a = \sqrt{b^2 + c^2 - 2bc\sin A} \quad (6)$$

(3) Direction (Attitude)

The direction is represented as an angle "B" formed by a straight line connecting the center "O", i.e., the position of the radar antenna and a point represented as (Rmin $\theta_S$, $\theta_S$) and by the straight line "a".

$$B = \sin^{-1}(b \cdot \sin A/a) \quad (7)$$

Data relating to the size, width and direction of a group of radar echoes obtained as in the foregoing are written into the ship track memory unit 32 shown in FIG. 1. The ship track is displayed in seven colors. For example, the relationship between the breadth of a group of radar echoes and display colors is as shown in FIG. 12. Here, a display color "black" indicates no paints on the face of the cathode ray tube. Thus, a group of radar echoes with its breadth being smaller than five meters is regarded as noises and not displayed.

In the same manner, also with regard to the dimensions and direction of a group of radar echoes, the relationship between values thereof and display colors have been stored in the ROM 35 respectively. The size and direction of a group of radar echoes are displayed in colors depending on a display mode selected.

The CPU 33 performs processes in the order of the steps shown in FIGS. 2(A) through 2(E). Table "A", Table "B" and Table "C" will first be explained.

FIG. 5 shows the structure of the Table "A" which is formed by taking out echoes which have been written into and stored into the memory unit 10 or the memory unit 11 during one radar sweep. Here, echo numbers are assigned, in a first-to-last order of generation, to respective echoes which are generated in response to one search pulse radiated and during one radar sweep. "Rmin" represents the shortest range of the echoes with respect to the own ship. "Rmax" represents the longest range of the echoes with respect to the own ship. "P$\theta$" represents the present position of the own ship (longitude, latitude). N($\theta-1$) represents the number of echoes which are read out from the memory unit 10 or the memory unit 11 which store echoes produced during one radar sweep respectively. Here, ($\theta-1$) indicates that the data corresponding to one timebase sweep and read out from the memory unit 10 or the memory unit 11 are the ones obtained in response to one previous search pulse with respect to the latest search pulse radiated. It is to be noted that the data shown in FIG. 5 correspond to a case of ($\theta-1$)=2 shown in FIG. 4.

FIG. 6 shows the structure of the Table B or the Table C. Here, the number of echo is the number for identifying a group of echoes continuously generated in an angular direction. N($\theta-1$) indicates the number of echo groups. "W" represents the number or echoes continuously produced in an angular direction. "Rmin" and "Rmax" indicate respectively the values of the "Rmin" and "Rmax" which are successively taken thereinto from the Table A shown in FIG. 5. The respective data correspond to the data in the example shown in FIG. 4. It is to be noted that "A" in FIG. 6 is a datum (flag) for detecting interruption of continuous echo generation and reception in an angular direction.

FIG. 2(A) through FIG. 2(E) illustrate flowcharts showing orders of processes performed by the CPU 33. These processes are started by an interrupt at an instant when a trigger pulse "s'" is generated. As shown in FIG. 2(A), signals representative of range to be searched, an antenna bearing $\theta$, P$\theta$ (position of the own ship) and a display mode are inputted by means of the input/output device 36 (at a step "n40"). Then, a memory area storing signals to be read out therefrom is selected depending on the display mode set (at a step "n41"). For example, if a dimensions display mode is selected, the memory elements of an area storing signals representative of dimensions in the ship track memory unit 32 are identified by addresses "h" and "v". Then, it is judged whether the number of ($\theta-1$) i.e., the previous radar sweep is odd or even (at a step "n42"). If ($\theta-1$) is odd, the processes shown in FIG. 2(B) and FIG. 2(C) are performed, while ($\theta-1$) is even, the steps shown in FIG. 2(D) and FIG. 2(E) are performed.

If ($\theta-1$) is odd, the CPU 33 takes out the echo data corresponding to one radar sweep from the memory unit 10 thereinto and forms a Table "A" shown in FIG. 5, as illustrated in FIG. 2(B) (steps n3, n4 and n6).

Then, "I" is provided with an initial value "1" ( (at a step n7). "I" is used as a loop counter for reading out the contents in the Table "A" formed, in the order of small-to-large echo number. Further, "J" is provided with an initial value "1". "J" is used as a loop counter for reading out the contents in the Table "C" in the order of small-to-large echo number. At a step "n9", it is judged whether the I-th echo in the Table "A" and the J-th echo in the Table "C" are continuous. If these two echoes are not continuous with each other, "J" is increased by one and thus, continuity with the next echo in the Table "C" is checked (steps n10, n11 and n9). ($\theta-2$) at a step n11 indicates that the data in the Table "C" have been obtained based on echoes received during a two-previous radar sweep.

If the echo in the Table "A" is not continuous with any echoes in the Table "C", the following process is performed at a step n12 to produce data in the Table "B". The data of the echo number "I" are produced in the following way.

(1) The "W" is provided with "1".

(2) The "Rmin" is provided with the value of the I-th "Rmin" in the Table "A".

(3) The "Rmax" is provided with the value of the I-th "Rmax" in the Table "A".

(4) "A" is reset.

In this way, newly appeared echo signals are memorized. Thereafter, "I" is increased by one, and the data of the next echo number is checked in terms of the continuity, and the Table "B" is formed (steps n15, n16 and n8). At a step n9, if it is judged that the I-th echo in the Table "A" and the J-th echo in the Table "C" are continuous with each other, the following process is performed at a step n13 to write the data into the Table "B". The data of the echo number "I" are produced in the following way.

(1) Into the "W", there is written into a value obtained by adding "1" to the J-th "W" of the Table "C".

(2) Into the "Rmin", there are written into all the J-th "Rmin" values in the Table "C" and with the I-th "Rmin" value in the Table "A".

(3) Into the "Rmax", there are written into all the J-th "Rmax" values in the Table "C" and with the I-th "Rmax" in the Table "A".

(4) "A" is reset.

Then, at a step n14, the J-th "A" in the Table "C" is set. This causes the echo-data transfer from the Table "C" to the Table "B" to be memorized.

When the same process is completed with all the echoes written in the Table "A", all the contents in the Table "A" are erased to be ready for deriving echoes obtained during the next radar sweep, at a step n17. It is to be noted that if no echoes are found in the data written into at a step n3, all the contents in the Table "B" are directly erased.

Next, with the latter processes shown in FIG. 2(C), such functions as deriving echoes which are not continuously generated, recognizing noises and writing marks in the ship track memory unit are performed.

First, the loop counter "J" for specifying the echo number in the Table "C" is set at an initial value "1", the state of the J-th "A" in the Table "C" is checked (steps n18 and n19). If "A" is in a set state, it indicates that echoes are still continuous therebetween. If "A" is in a reset state, it indicates that the data are not transferred to the Table "B" at a step 13, i.e., the echoes terminated to appear in a two-previous radar sweep and not appeared in the previous sweep. If "A" is in a reset state, the value of the J-th "W" in the Table "C" is checked at a step n20. The relationship $W \leq 2$ indicates that echoes do not extend over more than two radar sweeps in an angular direction. The relationship $W > 2$ indicates that a group of echoes extends over more than two radar sweeps in an angular direction. If the relationship is $W > 2$, there is obtained a direction "$\theta_c$" bisecting the J-th group of echoes in the Table "C" at a step n21. This value is obtained in accordance with the expression $\theta - 2 - (W/2)$, i.e., by identifying an memory area storing echo data produced during a W/2-previous radar sweep with respect to the latest radar sweep. At a step n22, the value of "Rmin" represented as "$\theta_c$" is read out. Then, the size of a group of echoes is obtained by performing a computation in accordance with the equation (1) (at a step n23). The width of the group of echoes is obtained by performing computations in accordance with the equations (2) through (6) (at a step n24). The direction of the group of echoes is obtained by a computation according to the equation (7) (at a step n25). At a step n26, computations are performed based on longitude and latitude of the reference point of the ship track memory unit, range, "N", "Rmin" and "P$\theta$" to produce a point on the ship track, and marks comprising a point or a plurality of points are written into three memories storing the size, width and direction respectively. If $A = 1$, writing signals into the ship track memory unit is not done (from a step n19 to another step n27). Also, if $A = 0$ and $W \leq 2$, writing signals into the ship track memory unit is not done (from a step n20 to another step n27).

After performing all the foregoing processes with all the echo numbers, all the contents in the Table "C" are erased to be ready for forming the data in the Table "C" in association with the next radar sweep and to complete a series of interrupt processes (steps n27, n28 and n29).

If the previous sweep number ($\theta - 1$) is even, processes illustrated in FIG. 2(D) and FIG. 2(E) are performed. The general flow of these processes are almost the same as in FIG. 2(B) and FIG. 2(C). Differences therebetween lie in that (i) at a step n3, echoes corresponding to one radar sweep are read out from the memory unit 11 and written thereinto, and (ii) the relationship between the Table "B" and the Table "C" in their use is reversed. Thus, if ($\theta - 1$) is even, data are produced in the Table "C" by referring to the data in the Table "A" and the Table "B".

Figure 8A:
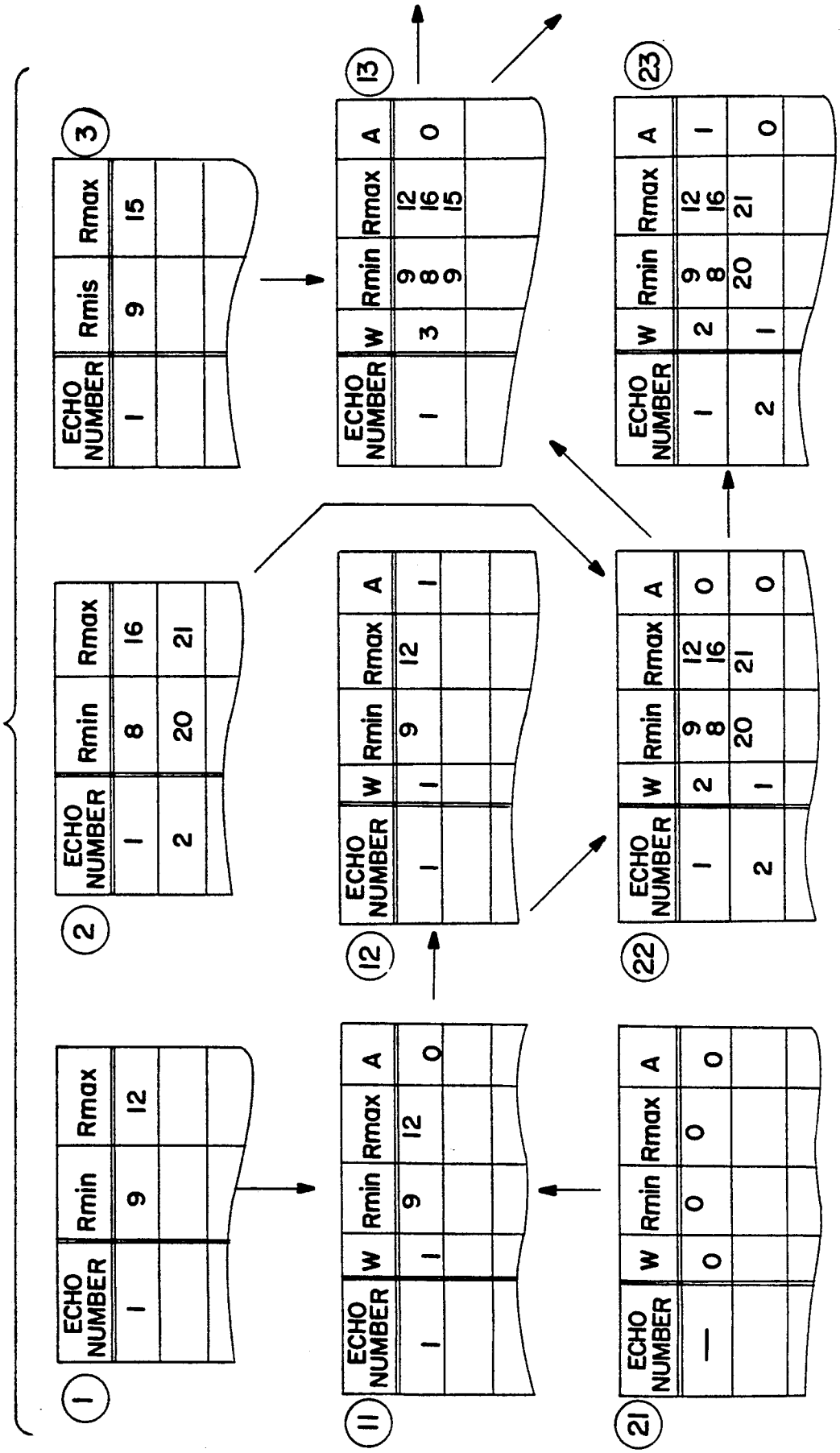
Figure 9:
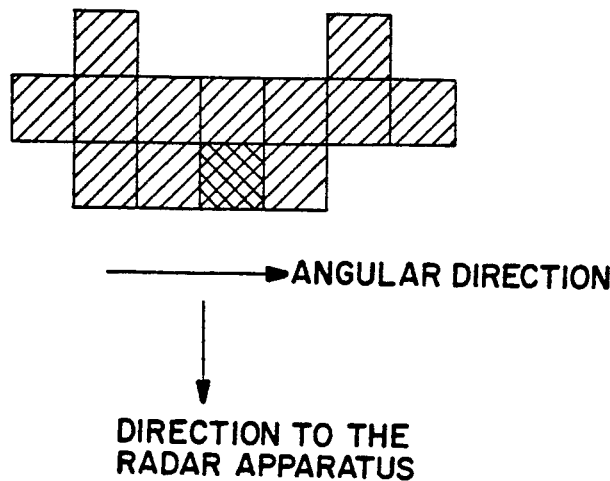
FIG. 9 is a drawing for explaining a process for transforming a group of radar echoes to fine spots.
Figure 14:
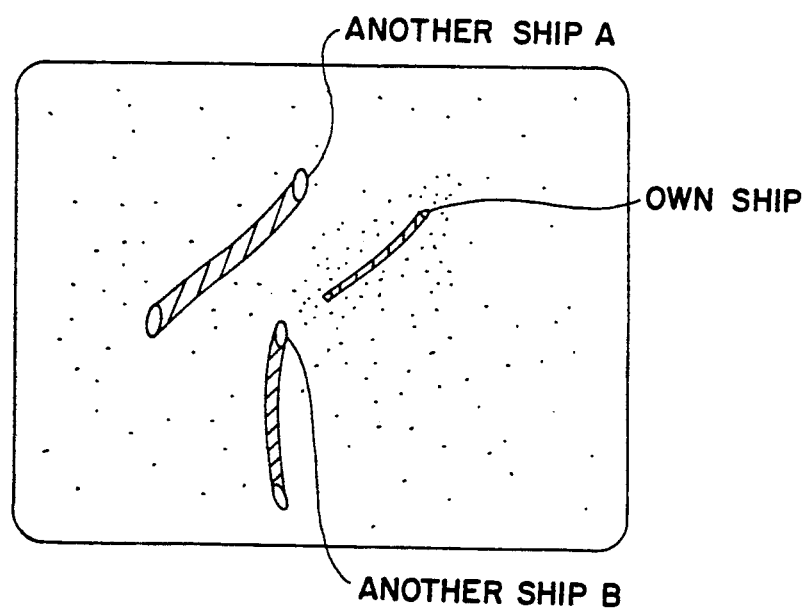
FIG. 14 is a drawing showing a display example presented by a conventional ship track indicating apparatus.

The contents in the Table "A", Table "B" and Table "C" which are varied resulting from the foregoing steps are shown in FIG. 8. This example corresponds to a case in which echoes as shown in FIG. 4 are received. Referring to FIG. 8, ①through ⑤ show a variation in the Table "A", and 11 through 15 show a variation in the Table "B", and 21 through 25 show a variation in the Table "C". A numeral in the lowest figure corresponds to a value of ($\theta - 1$) shown in FIG. 4.

When ($\theta - 1$) is equal to one, the contents in the Table "A" will be such that "Rmin"=9 and "Rmax"=12 are written into at the echo number "1" in the Table "A", as shown at ①. At this moment, data are not formed in the Table "C", as shown at 21. Based on the contents in the Table "A" and the Table "C", data are formed in the Table "B", as shown at 11. When ($\theta - 1$) becomes equal to "2", data relating to two echoes are written into the Table "A" as shown at ②, and data are formed in the Table "C" as shown at 22 based on the data shown at ② and 11. The contents in the Table "B" are as shown at 12 in which it is seen that a flag "A" is set for memorizing a data transfer to the Table "C" therefrom. When ($\theta - 1$) becomes three, data are formed in the Table "A" as shown at ③, and data are formed in the Table "B" as shown at 13 based on the contents shown at ③ and 22. It is to be noted that as shown at 23, since the data of an echo number "2" in the Table "C" result from echoes not continuously generated, the data are not transferred to the Table "B". Although the flag "A" remains in a state of reset, the echoes of the echo number "2" are not displayed to form a ship track, since a condition $W > 2$ is not met. When ($\theta - 1$) becomes four, data are formed in the Table "A" as shown at ④, and data are formed in the Table "C" as shown at 24 based on the contents shown at ④ and 13. When ($\theta - 1$) becomes five, data are not formed in the Table "A" as shown at ⑤, and the contents in the Table "B" are erased as shown at 15. Further, since the flag "A" in the Table "C" is in a reset state as shown at 25 and a condition $W > 2$ is met, by performing the steps n21 through n26 shown in FIG. 2, data relating to an echo out of a group of echoes is derived and resulting signals representative of marks are written into corresponding memory elements in the ship track memory, with the echo being in the central direction within the sector covering the group of echoes and at the closest point from the own ship, i.e., at "Rmin"=8.

Figure 10A:
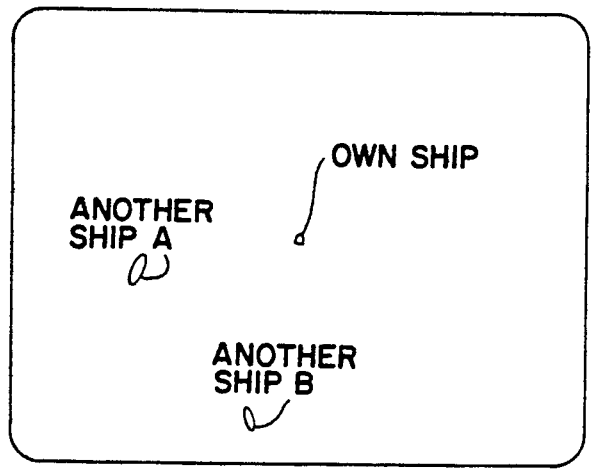
FIGS. 10(A) and 10(B) are display examples on the screen of an indicator presented by the embodiment.
Figure 10B:
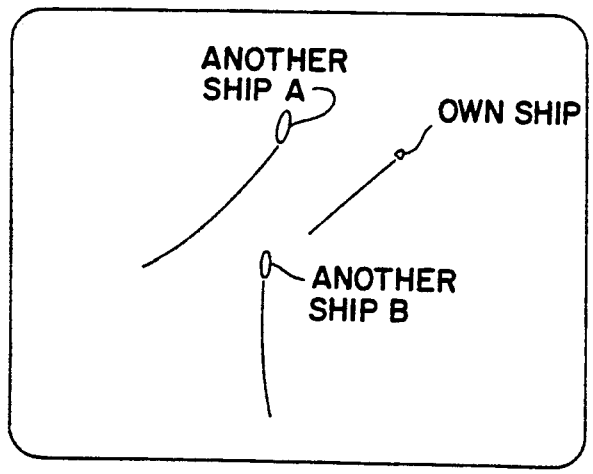

FIG. 10(A) and FIG. 10(B) show an example of an image displayed on the screen of the indicator. The indicator for presenting an image display as shown in FIG. 10(A) is switched to a ship track display mode to present another display as shown in FIG. 10(B) in which tracks of other ships together with the present radar image are displayed after some predetermined time elapses. If, for example, a dimensions display mode is selected, the ship track is displayed in colors corresponding to sizes of groups of echoes. The ship track of the own ship is also indicated together with a mark representative of the present position of the own ship. It is to be noted that a ship track of the own ship is presented by identifying memory elements in the ship track memory unit based on longitude and latitude of the reference point in the ship tract memory, range, "N" and "P$\theta$" and by writing display signals representative of the ship track of the own ship into the ship track memory unit.

It should be noted that although the foregoing embodiment of the present invention is constructed to selectively display signals representative of one of dimensions, width or direction of a group of radar echoes, only one information can be displayed. It is also possible to construct the apparatus in a manner that each information of the three is automatically selected in turn, for example, every five seconds to display it. Although colors are changed to indicate characters of groups of radar echoes in the foregoing embodiment according to the present invention, it is also possible to indicate them with different brightnesses or lines having different widths.

Further, it is also possible to collectively display dimensions, width and direction of a group of radar echoes simultaneously. For example, as shown in FIG. 13, it is also possible to display the present position of another ship with a circular spot designated as "a", to display the dimensions of the group of radar echoes with a color of a straight line designated as "b" and to display the width of the group of the radar echoes with the length of the straight line and further to display the direction (attitude) thereof with the direction of the straight line "b".

As explained in the foregoing, the present invention displays old radar echoes as successive fine spots with noises eliminated, when radar echoes reflected by other ships and detected by a radar apparatus are successively displayed as ones over others, so that ship tracks of other ships are easily recognized respectively. Since size and/or attitude of a group of echoes can be recognized from displayed images, there can be easily predicted movement of another ship from the attitude and movement capability thereof from the size of the ship. This makes safe navigation possible, and the ship tracks of other ships can be clearly recorded.

I claim:

1. A ship track indicating apparatus comprising:
    radar means for successively radiating search signals in different azimuthal directions;
    receiver means for receiving radar echo signals;
    distinguishing means for distinguishing a group of received radar echoes extending over a predetermined number of radar sweeps to eliminate noise received by said receiver means;
    deriving means for deriving a plurality of position signals based on said group of received radar echoes, each position signal being representative of one point in an area where said group of received radar echoes are produced and thus representative of a position of a ship, a track of ship being represented by a plurality of said one points;
    ship track memory means, operatively connected to said deriving means, for storing each position signal representing a position of the ship and a track of a ship;
    sizing means for determining a size of a target ship from a group of distinguished radar echoes and for producing size signals representative of said size of said target ship;
    color converter means for converting signals supplied from said ship track memory means to display signals corresponding to different colors based on said size of said target ship supplied from said sizing means; and
    indicating means for displaying a track of a ship and said size of said target ship from said display signals.

2. An indicating apparatus for displaying radar echoes and the track of a ship comprising:
    radar means for successively radiating search signals in different azimuthal directions;
    receiving means for receiving radar echo signals;
    first memory means for storing received echo signals;
    distinguishing means for distinguishing a group of received radar echoes extending over a predetermined number of radar sweeps to eliminate noise received by said receiving means;
    deriving means for deriving a plurality of position signals based on said group of received radar echoes, each position signal being representative of one point in an area where said group of received radar echoes are produced and thus representative of a position of a ship, a track of a ship being represented by a plurality of said one points;
    ship track memory means for storing said position signals representing a position of the ship and a track of a ship;
    sizing means for determining a size of a target ship from a group of distinguished radar echoes and for producing size signals representative of said size of said target ship;
    color converter means for converting said position signals supplied from said ship track memory means to first display signals corresponding to different colors based on said size of said target ship supplied from said sizing means and for converting the received echo signals supplied from said first memory means to second display signals corresponding to colors different from said colors of said first display signals; and
    indicating means for displaying said size of said ship and a track of a ship from said first and second display signals.

* * * * *